March 19, 1957 W. M. TUCKER 2,785,534
WHEEL BRAKE CYLINDER ASSEMBLY
Filed March 16, 1955
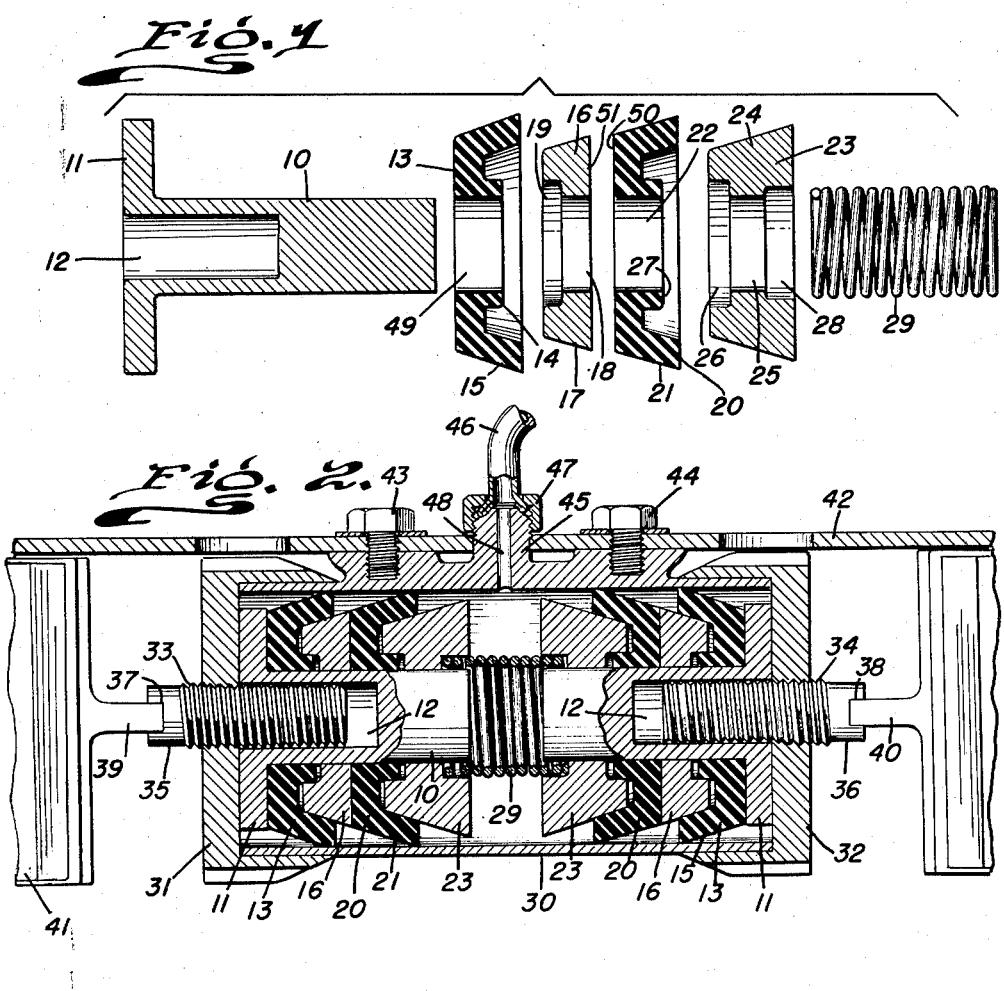
INVENTOR.
William M. Tucker
BY Victor J. Evans & Co.
ATTORNEYS United States Patent Office 2,785,534
Patented Mar. 19, 1957

2,785,534

WHEEL BRAKE CYLINDER ASSEMBLY

William M. Tucker, Amarillo, Tex.

Application March 16, 1955, Serial No. 494,610

3 Claims. (Cl. 60—54.6)

This invention relates to sealing washers of brake cylinders for actuating bands of brake drums of individual wheels of a motor vehicle, and in particular, a cylinder assembly including a plurality of cup shaped washers of resilient material positioned at each end of the cylinder with spreading and expanding elements coacting with the washers whereas upon failure of the first sealing washer a second washer is provided at each end to receive the pressure and provide a positive seal for the cylinder.

The purpose of this invention is to eliminate leakage of conventional wheel brake cylinders by providing secondary resilient sealing washers with means for spreading the washers whereby upon failure of the first washers the secondary washers coact with the first washers to retain a positive seal.

In the conventional wheel brake cylinders, cups are positioned against pistons whereby with the brake fluid injected into the intermediate parts of the cylinders the cups, which are made of rubber or other suitable resilient material, drive the pistons outwardly applying the brakes. The cups are formed of comparatively thin material and wear developing between outer surfaces thereof and the inner surfaces of the cylinders permits leakage of the brake fluid and continued leakage of the brake fluid in a brake system causes the brakes to be inoperative.

With this thought in mind, this invention contemplates replacing the conventional cup of rubber or other resilient material with a pair of washers having outwardly inclined flanges in combination with frusto-conical shaped spreading elements whereby upon failure of the first or inner washer the said first or inner washer coacts with a secondary washer providing a double seal whereby continued and indefinite sealing of brake cylinders is assured.

The object of this invention is, therefore, to provide a wheel brake cylinder assembly wherein the possibility of the leakage of brake fluid from ends of the cylinder is substantially eliminated.

Another object of the invention is to provide a substantially non-leakable wheel brake cylinder seal assembly that is adapted to be incorporated in a conventional wheel brake cylinder.

Another important object of the invention is to provide an improved sealing element assembly for wheel brake cylinders in which parts thereof are directly connected to brake bands of brakes of a vehicle in which the connections of the parts to the brake bands are readily adjustable.

A further object of the invention is to provide an improved sealing assembly for ends of wheel brake cylinders in which the sealing units are of simple and economical construction.

With these and other objects and advantages in view, the invention embodies stub shafts having flanges on outer ends thereof and having stud receiving openings extended inwardly from the ends, cup shaped washers of resilient material mounted on the stub shafts and positioned against said flanges, expanding washers having frusto-conical shaped outer surfaces slidably mounted on said shafts and positioned to spread the flanges of the former or secondary sealing washers, first or inner sealing washers of rubber or other resilient material and also having inclined peripheral flanges also mounted on said stub shafts and positioned against the expanding washers, spreaders having frusto-conical shaped outer surfaces on inner ends of the stub shafts and positioned to spread the flanges of said first or inner washers and a spring extended over inner ends of said stub shafts and positioned to urge the spreaders, washers, and expanding elements against the flanges at the ends of the stub shafts, said parts being assembled in a brake cylinder and having cup shaped elements with threaded studs extended therethrough slidably mounted on the ends of the cylinder and positioned with the studs adapted to receive tabs on the ends of a brake band for spreading said brake band as brake fluid under pressure is supplied to the intermediate part of the cylinder through a supply connection.

Other features and advantages of the invention will appear from the following description, taken in connection with the drawing, wherein:

Figure 1 is an exploded view showing a longitudinal section through the sealing elements at one end of a brake cylinder with the cylinder and mounting and connecting elements eliminated.

Figure 2 is a longitudinal section through a wheel brake cylinder with the sealing elements in operative positions therein and showing studs extended from ends of the cylinder operatively engaged with tabs on the ends of a brake band.

Referring now to the drawing, wherein like reference characters denote corresponding parts, the improved wheel brake cylinder assembly of this invention includes a spindle 10 having a circular plate or flange 11 on one end with a bore 12 extended inwardly from the end on which the flange is positioned, a secondary washer 13 having a hub 14 and a peripheral flange 15, an expanding disc 16 having an inclined outer surface 17 and provided with a bore 18 for receiving the spindle 10 and a counterbore 19 for receiving the hub 14 of the washer 13, an inner or first washer 20 also of resilient material and having an inclined outer surface 21 and a bore 22 through which the spindle 10 extends, a spreader 23 having an inclined outer surface 24, a bore 25 for receiving the spindle 10, a counterbore 26 for receiving a hub 27 of the washer 20 and a counterbore 28, and a spring 29 adapted to be positioned between a pair of spreaders with ends of the spring extended into the counterbores 28.

As illustrated in Figure 2, a duplicate set of elements, as illustrated in Figure 1, with the exception of the spring 29, is positioned in the opposite end of a cylinder, such as the cylinder 30, and the flanges 11 of the stub shafts or spindles 10 are positioned to bear against inner surfaces of caps 31 and 32 slidably mounted on ends of the cylinder and threaded on studs 33 and 34, outer ends 35 and 36, respectively, of which are provided with slots 37 and 38 which receive tabs 39 and 40 on ends of a brake band 41.

The cylinder 30, which is secured to a disc or plate 42 of a wheel housing or mounting with cap screws 43 and 44, is provided with a threaded boss 45 on the end of which a brake fluid supply tube 46 is secured with a coupling nut 47. An opening 48 extends through the boss 45 providing a passage for brake fluid from the supply tube 46 to the interior of the cylinder 30.

The parts are assembled with the secondary washers 13 positioned on the stub shafts or spindles 10 with the spindles extending through bores 49 of the washers and with these washers positioned against the flanges 11 the expanding discs or elements 16 are placed on the spindles with the ends of the hubs 14 extended into the counterbores 19. With these parts in position, the first or inner washers 20 are placed on the spindles with surfaces 50 of the washers placed against surfaces 51 of the expanding elements and with these washers in position the spreaders 23 are placed on the spindles with the counterbores 26 extended over ends of the hubs 27. The spring 29 is inserted with one end over the inner end of a spindle 10 and extended into the counterbore 28 and with the spring in position a duplicate assembly is inserted in the opposite end of the cylinder with the extended end of the spring positioned over the end of the spindle and in the counterbore 28 of the spreader on the opposite side of the center.

With the parts assembled as disclosed and described, the tension of the spring 29 urges the spreader elements 23 into engagement with the flanges of the first washers 20 whereby the flanges are in sealing relation with the inner surface of the cylinder 30 and, consequently, brake fluid under pressure forced into the cylinder drives the elements outwardly of the ends of the cylinder applying the brakes. Should wear develop in the flanges of the washers 20 whereby the fluid leaks around the flanges the flanges of the inner or first washers 20 continue to be at least partially effective and these washers coact with the spreaders 23 and expanding discs 16 to urge the flange of the secondary washers 13 outwardly thereby providing a positive seal. The possibility of the flanges of both resilient washers failing is substantially negligible. The possibility of brake fluid leaking from a cylinder in which this assembly of sealing elements is used is, therefore, substantially eliminated.

It will be understood that modifications, within the scope of the appended claims, may be made in the design and arrangement of the parts without departing from the spirit of the invention.

What is claimed is:

1. A wheel brake cylinder seal assembly comprising a spindle having a plate on one end and a bore extended inwardly through said plate, a washer of resilient material having a peripheral flange mounted on the spindle and positioned against said plate, an expanding disc having an inclined peripheral surface mounted on the spindle and positioned to extend into said washer, another washer of resilient material and also having a peripheral flange mounted on the spindle and positioned against said disc, a spreader also having an inclined peripheral surface mounted on the spindle and positioned whereby the inclined peripheral surface is adapted to urge the flange of the washer against which the spreader is positioned outwardly, and resilient means for urging said washers, spreader, and expanding disc toward the flange on the end of the spindle, said washers having hubs and said expanding disc and spreader being provided with counterbores positioned to receive the hubs of the washers.

2. A wheel brake cylinder seal assembly comprising a spindle having a plate on one end and a bore extended inwardly through said plate, a washer of resilient material having a peripheral flange mounted on the spindle and positioned against said plate, an expanding disc having an inclined peripheral surface mounted on the spindle and positioned to extend into said washer, another washer of resilient material and also having a peripheral flange mounted on the spindle and positioned against said disc, a spreader also having an inclined peripheral surface mounted on the spindle and positioned whereby the inclined peripheral surface is adapted to urge the flange of the washer against which the spreader is positioned outwardly, and resilient means for urging said washers, spreader, and expanding disc toward the flange on the end of the spindle, the flanges of said washers being frusto-conical shaped, a brake cylinder having said cylinder seal assembly positioned therein in opposed relation to a similar cylinder seal assembly, and caps having threaded studs therein slidably mounted on the ends of said brake cylinder.

3. In a wheel brake cylinder assembly, the combination which comprises a cylinder, caps slidably mounted on ends of the cylinder, threaded studs having slots in outer ends thereof threaded through said caps and positioned to extend into ends of the cylinder, spindles having bores in the outer ends positioned with the bores adapted to receive the threaded studs, said spindles having flanges on the ends into which the bores extend, secondary washers of resilient material and having frusto-conical shaped outer surfaces positioned on the spindles and located against said flanges, expanding discs having frusto-conical shaped outer surfaces mounted on the spindles and positioned to expand the outer surfaces of the secondary washers, first washers of resilient material and having frusto-conical shaped outer surfaces mounted on the spindles and positioned against said expanding discs, spreaders having frusto-conical shaped outer surfaces mounted on the spindles and positioned with the outer surfaces in engagement with the inner surfaces of said first washers, a spring positioned between the spreaders, the ends of said spring being extended over inner ends of said spindles, and a connection for supplying brake fluid to the intermediate part of the cylinder extended from one side of the cylinder.

References Cited in the file of this patent

UNITED STATES PATENTS

| | | |
|---|---|---|
| 1,122,574 | Cobb | Dec. 29, 1914 |
| 1,396,714 | Carmichael | Nov. 8, 1921 |
| 1,559,766 | O'Bannon | Nov. 3, 1925 |
| 2,701,172 | Koester | Feb. 1, 1955 |